US008288889B2

(12) United States Patent
Holmberg

(10) Patent No.: US 8,288,889 B2
(45) Date of Patent: Oct. 16, 2012

(54) METHOD AND ARRANGEMENT FOR LIMITING ELECTRIC POWER REQUIRED BY ELECTRIC LOADS

(75) Inventor: Mikael Holmberg, Porvoo (FI)

(73) Assignee: ABB Oy, Helsinki (FI)

( * ) Notice: Subject to any disclaimer, the term of this patent is extended or adjusted under 35 U.S.C. 154(b) by 532 days.

(21) Appl. No.: 12/613,187

(22) Filed: Nov. 5, 2009

(65) Prior Publication Data

US 2010/0156178 A1 Jun. 24, 2010

(30) Foreign Application Priority Data

Dec. 19, 2008 (EP) .................................. 08172322

(51) Int. Cl.
*H02J 1/04* (2006.01)
(52) U.S. Cl. ......................................................... 307/35
(58) Field of Classification Search ................... 307/9.1, 307/10.1, 35; 700/22, 295
See application file for complete search history.

(56) References Cited

U.S. PATENT DOCUMENTS

| 4,117,537 | A | 9/1978 | Muench |
| 6,301,528 | B1 | 10/2001 | Bertram et al. |
| 2004/0057177 | A1 | 3/2004 | Glahn et al. |
| 2004/0124703 | A1 | 7/2004 | Tani et al. |
| 2005/0239518 | A1 | 10/2005 | D'Agostino et al. |
| 2006/0085100 | A1 | 4/2006 | Marin-Martinod et al. |
| 2008/0221741 | A1* | 9/2008 | Pillar et al. ..................... 701/1 |

FOREIGN PATENT DOCUMENTS

| EP | 1 560 311 A1 | 8/2005 |
| JP | 10-094170 | 4/1998 |
| JP | 2005-033952 | 2/2005 |
| KR | 10-2006-0045582 | 5/2006 |

OTHER PUBLICATIONS

An English Translation of the Office Action dated Jun. 21, 2011, issued in the corresponding Japanese Patent Application No. 2009-287147.
European Search Report dated Jul. 14, 2009.
An English Translation of the Office Action (Notification of the Reasons for Rejection) dated May 9, 2011, issued in the corresponding Korean Patent Application No. 10-2009-0124333.

* cited by examiner

*Primary Examiner* — Daniel Cavallari
(74) *Attorney, Agent, or Firm* — Buchanan Ingersoll & Rooney PC

(57) ABSTRACT

A method and arrangement for limiting an electric power required by at least two electric loads, each of which has a predetermined priority level, the arrangement comprising means (31, 32, 33) for monitoring a total electric power required by the at least two electric loads (21, 22, 23), and means (31, 32, 33) for reducing, in a priority-level-wise manner, individual electric powers required by the electric loads (21, 22, 23) having the predetermined priority levels by starting from electric load or loads having the lowest priority level and proceeding, one priority level at a time, towards the highest priority level until the monitored total electric power does not exceed a predetermined threshold value.

9 Claims, 3 Drawing Sheets

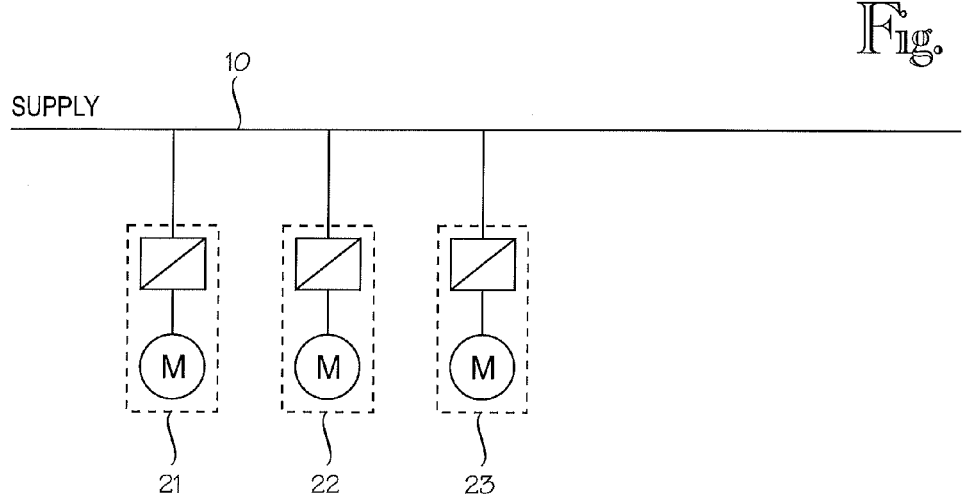
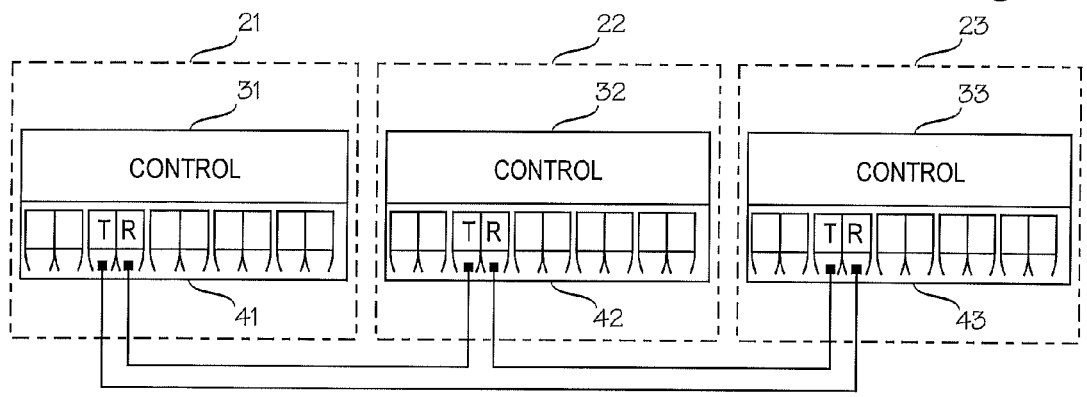

METHOD AND ARRANGEMENT FOR LIMITING ELECTRIC POWER REQUIRED BY ELECTRIC LOADS

FIELD OF THE INVENTION

The invention relates to limiting an electric power required by at least two electric loads.

BACKGROUND OF THE INVENTION

Various power systems, such as crane applications aboard vessels or in harbors, comprise a plurality of electric loads supplied from the same power source. FIG. 1 shows an example of such a power system comprising three electric loads 21, 22, 23. The electric loads 21, 22, 23 in this example are electric drives, each comprising an electric motor driven by an inverter or a frequency converter. The electric loads are each connected to the same power source 10, such as a supply line or network, which may be an AC or DC power source, depending on the application in question.

Sometimes the available maximum power from the power source in such power systems comprising several loads is temporarily or constantly limited in comparison to the total power required when all the electric loads, such as motions of a crane, are simultaneously in use with full power. In the example of FIG. 1, the individual maximum powers required by the electric loads 21, 22 and 23 could be, for instance, 20 kW, 10 kW and 5 kW, respectively, and the maximum power capacity of the power source could be only 30 kW, which is less than the total maximum power of 35 kW of the loads. In this kind of situation the power source, a feeder network for example, cannot feed all the loads with full power. This kind of situation may be due to an underpowered power source (possibly an intentionally limited maximum power) or a temporary problem in the power source, for example. In the case of a crane application, for instance, the power required by the system is related to the speed range used in the crane motions according to the following equation:

$$P = Q*V*g/\text{efficiency}, \quad (1)$$

where:
P=motor power required in kW
Q=load in tons (1000 kg)
V=speed in m/sec
g=standard acceleration of gravity ($\approx 9.81$ m/s$^2$)

In the case of a crane application, for instance, this means that the crane operator needs to select manually one crane motion at a time or to drive slowly to reduce the total power required by the crane, which may be problematic.

U.S. Pat. No. 4,117,537 discloses a solution for limiting energy consumption. In the disclosed solution, when a desired power consumption rate is exceeded, the loading of modulating loads is reduced. If more than one modulating load is present, a priority system of modulating load reduction can be accomplished by setting different reduction rates for different loads.

A drawback related to the above solution is that the loading of all the modulating loads is reduced at the same time, although possibly at a different rate.

BRIEF DESCRIPTION OF THE INVENTION

The object of the invention is thus to provide a method and an apparatus for implementing the method so as to solve or at least alleviate the above problem. The object of the invention is achieved with a method, a computer program product, an arrangement, and an electric drive that are characterized by what is stated in the independent claims. Preferred embodiments of the invention are described in the dependent claims.

The invention is based on the idea of reducing individual electric powers required by electric loads in a priority-level-wise manner by first reducing an individual electric power or powers required by the electric load or loads of the lowest priority level and then proceeding, one priority level at a time, towards the highest priority level and each time reducing the individual electric power or powers required by the electric load or loads of the priority level in turn until the monitored total electric power does not exceed a predetermined threshold value.

An advantage of the invention is that it enables more important higher priority loads to receive full power as long as possible as the power reduction procedure starts from the lowest priority load or loads and proceeds level by level towards the higher priority loads until the required total power level is achieved. The invention can be used in connection of any application which comprises electric loads. In addition, the invention enables an automatic power adjustment which allows an operator of the system, such as a crane application, to concentrate on the operation of the system without having to concern possible power issues. This improves the safety of the operation.

BRIEF DESCRIPTION OF THE FIGURES

In the following, the invention will be described in more detail in connection with preferred embodiments with reference to the accompanying drawings, in which FIG. 1 illustrates a block diagram of an electric system in which the invention may be used;

FIG. 2 illustrates a block diagram in accordance with an embodiment of the invention;

DETAILED DESCRIPTION OF THE INVENTION

The application of the invention is not limited to any specific system, but it can be used in connection with various electric systems to limit the electric power required by electric loads. FIG. 1 illustrates a simplified block diagram of an electric system in which the invention may be used. The figure shows only the components necessary for understanding the invention. It should be noted that the system may comprise any number of loads 21, 22, 23. The electric loads can be of any type, such as electric drives involving electric motors or other controlled loads. The power source 10 may be any type of AC or DC power source, such as a supply line or network, depending on the application in question. Moreover, the use of the invention is not limited to systems employing any specific fundamental frequency or any specific voltage level.

According to an embodiment of the invention, the electric power required by at least two electric loads 21, 22, 23, each of which has a predetermined priority level, comprises reducing in a priority-level-wise manner, one priority level at a time, the individual electric powers required by the electric loads having the predetermined priority levels by starting from the electric load or loads having the lowest priority level and proceeding towards the highest priority level until the monitored total electric power does not exceed a predetermined threshold value. Thus, each of the loads 21, 22, 23 has a predetermined priority level. Two or more loads may also have the same priority level or all the loads may have different priority levels. The priority levels may be set by an operator of the electric system and/or the priority levels may be automatically configured by the system itself according to some predetermined scheme or set of rules, for instance. The predetermined priority levels of the loads are preferably reconfigurable. The priority levels may be indicated with dedicated priority numbers. For example, the highest priority load may have priority number 1 and the lowest load the greatest number. In the case of three loads, the priority numbers from the highest to the lowest would thus be 1, 2, and 3. An inverse order of numbering could be used as well. The priorities of the different loads could also be indicated differently without this having any particular relevance to the basic idea of the invention.

Figure 5:
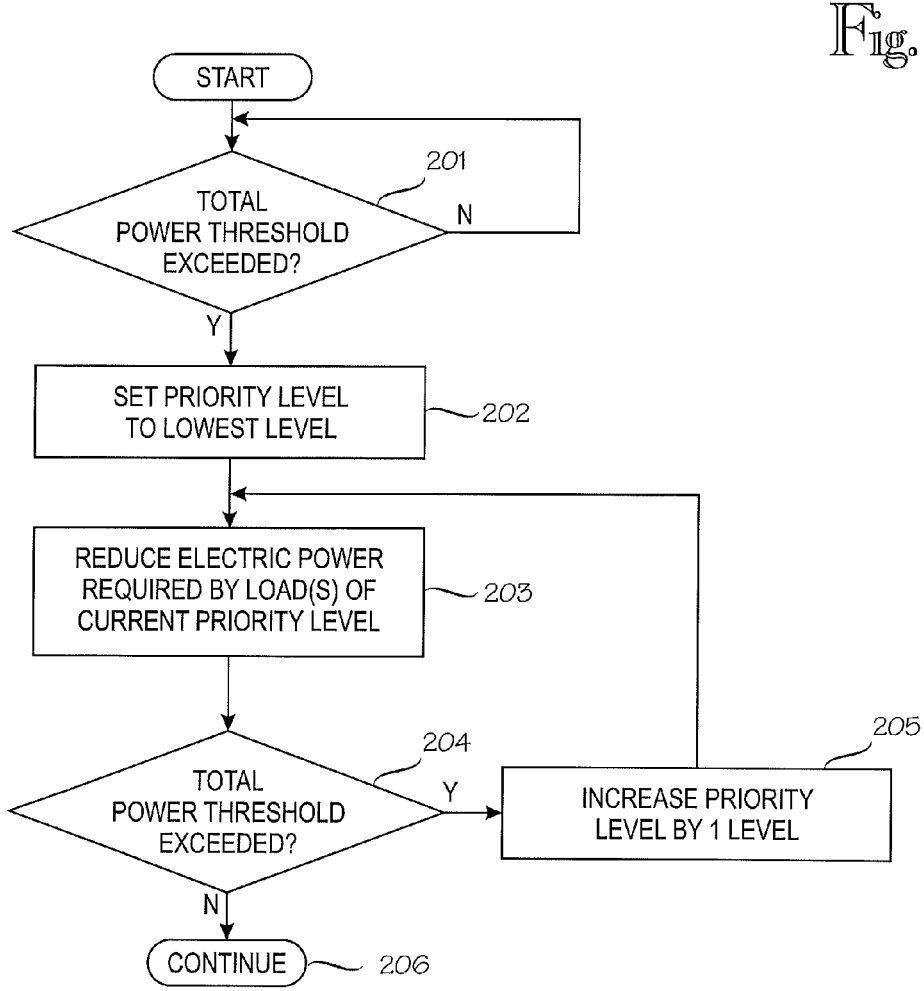
FIG. 5 illustrates a flow diagram in accordance with an embodiment of the invention.

FIG. 5 illustrates a flow diagram in accordance with an embodiment of the invention. A more detailed description of an embodiment is given in the following with reference to FIG. 5. In phase 201, the total electric power required by the electric loads is monitored, and if the total power exceeds a predetermined threshold, reduction of the total power required by the electric loads is started. First, in phase 202 the current priority level is set to the lowest level, if necessary. This ensures that the power reduction starts from the lowest priority level load or loads. Next, in phase 203, the electric power required by the load or loads of the current priority level is reduced. Since the current priority level is first set to the lowest level, the electric power required by the load or loads of the lowest priority level is reduced. After the reduction 203, it is checked 204 if the total power required by the electric loads still exceeds the predetermined threshold. If not, then the reduction has been adequate and the operation may continue. If the total power exceeds the predetermined threshold, next in phase 205 the current priority level is increased by one level, i.e. if the priority level was set to the lowest level, it is now increased to the second lowest level. Next, in phase 203 the electric power required by the load or loads of the current priority level is reduced again. Since the current priority level is now set to the second lowest level, the electric power required by the load or loads of the second lowest priority level is reduced. After the reduction 203, it is again checked 204 if the total power required by the electric loads still exceeds the predetermined threshold. If not, then the reduction has been adequate and the operation may continue. If the total power exceeds the predetermined threshold, next in phase 205 the current priority level is again increased by one level and in phase 203 the electric power required by the load or loads of the current priority level is reduced. Thus, phases 203, 204, and 205 are repeated until the total power required by the electric loads does not exceed the predetermined threshold such that during each repetition of phases 203, 204, and 205 the electric power required by the electric load or loads of one priority level is reduced at a time. By starting from the lowest priority level and proceeding towards the highest priority level the total power required by the electric loads can be gradually reduced, priority level by priority level, and higher priority loads left unaffected as long as possible.

Preferably, each of the loads 21, 22, 23 has a predetermined minimum power level which indicates how low the power of the individual load may be reduced. According to an embodiment, the reducing (e.g. phase 203) of an individual electric power required by an electric load or loads of a given priority level comprises reducing the individual electric power required by the electric load to the predetermined minimum power level. According to an alternative embodiment, the reducing (e.g. phase 203) of an individual electric power required by an electric load or loads of a given priority level comprises reducing gradually the individual electric power required by the electric load until the predetermined minimum power level is reached or until the monitored total electric power does not exceed the predetermined threshold value. Thus, according to the latter embodiment, the individual electric power required by the electric load or loads in question is gradually, either stepwise or continuously, reduced (e.g. in phase 203) while at the same time the total electric power is monitored. If the monitored total electric power drops below the predetermined threshold value before the predetermined minimum power level of the individual load is reached, then the reduction can be stopped. In the example of FIG. 5, this situation would mean that phase 204 would be unnecessary after step 203. The predetermined minimum power levels of the electric loads are preferably set such that the sum of the minimum power levels of the electric loads is equal to or less than the maximum power capacity of the power source 10 if the maximum power capacity of the power source 10 is known. This ensures that the total power required by the electric loads can always be reduced sufficiently, at the latest when the individual powers of the loads of all priority levels have been reduced to their minimum levels.

It should be noted that any quantity proportional to the power could be used instead of a power value to indicate the power of an individual load, the total power, the minimum power level of a load, or any other power, for example. In the case of a motor load or other similar load involving movement, for instance, the power required by the load is proportional to the speed of the motion according to equation 1. Accordingly, speed values could be used instead of power values in the various embodiments of the invention. This, however, has no relevance to the basic idea of the invention.

Figure 6:
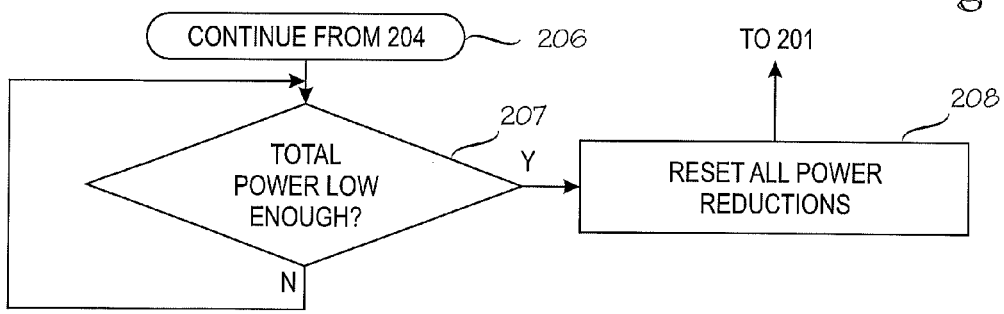
FIG. 6 illustrates a flow diagram in accordance with an embodiment of the invention.

FIG. 6 illustrates a flow diagram in accordance with an embodiment of the invention. The example of FIG. 6 shows a possible continuation of the operation of the embodiment of FIG. 5. After the electric power required by one or more electric loads has been reduced, as described above, the operation may continue such that the total electric power is monitored 207 and if the total electric power is low enough, i.e. below a certain threshold level, all the power reductions of one or more electric loads that are in force are reset 208, i.e. the individual loads are allowed to use their full powers without restrictions, and the operation may return to the normal state in phase 201. In phase 207, the threshold level the monitored total power must not exceed, may be the same threshold value as that used in phases 201 and 204 but from which a certain marginal has been reduced. The marginal is preferably set high enough such that it allows the load reductions to be removed. Further, the marginal could include a portion which provides certain hysteresis to the operation in order to prevent hunting of the load reductions. Instead of resetting 208 all load reductions at the same time, it would also be possible to reset the possible load reductions gradually, e.g. one by one. It is also possible that an operator of the system manually removes the possible load reductions and returns the operation to the normal state. It should be noted, however, that the way in which the load reductions are possibly reset or removed has no relevance to the basic idea of the invention.

The functionality according to the invention may be implemented in a centralized or distributed manner. A centralized way of implementation could be implemented by providing a control unit or device in the system which may be located in connection with one of the loads or as a separate unit. Such a control unit would then monitor the system and control the loads according to the above embodiments.

A distributed way of implementation could be implemented by providing each of the loads 21, 22, 23 with a suitable control functionality and connecting them together. FIG. 2 illustrates, in a simplified manner, an example of such a distributed system comprising three electric loads 21, 22, 23. Each of the loads has a control unit 31, 32, 33 in connection therewith for providing the functionality according to the various embodiments of the invention described above. Such a control unit 31, 32, 33 may be a separate unit or, in the case of an electric drive, for example, the control unit may be the control unit of the electric drive. Each of the control units 31, 32, 33 preferably comprises or is connected to a transmitter-receiver unit 41, 42, 43 which provides a communication link between the loads 21, 22, 23. In the example connection of FIG. 2, the loads 21, 22, 23 have been connected according to a ring topology but other topologies, such as a star, a tree or a mesh topology, could be used as well. The type of the link or the protocol(s) used therein has no relevance to the basic idea of the invention. The communication link between the loads 21, 22, 23 could be a wired or wireless link. An example of a possible link type is Profibus (Process Field Bus).

Figure 3:
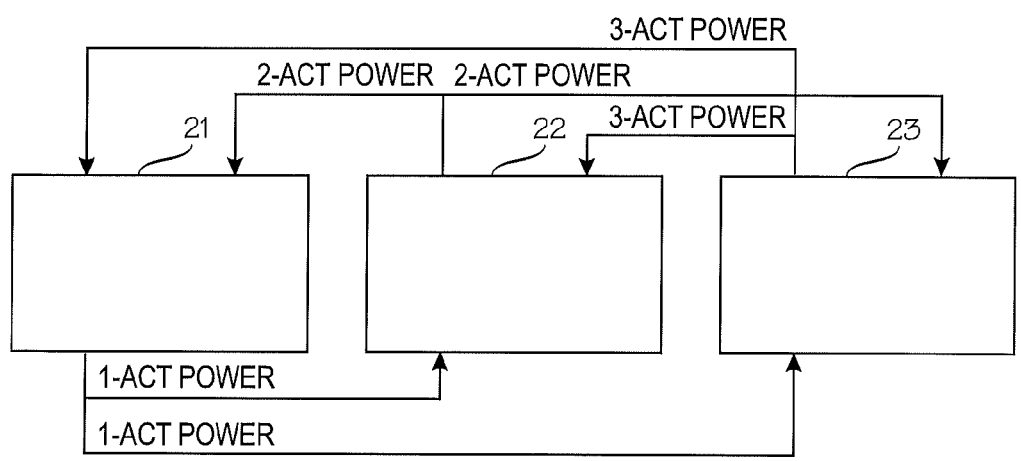
FIG. 3 illustrates a signalling diagram in accordance with an embodiment of the invention.
Figure 4:
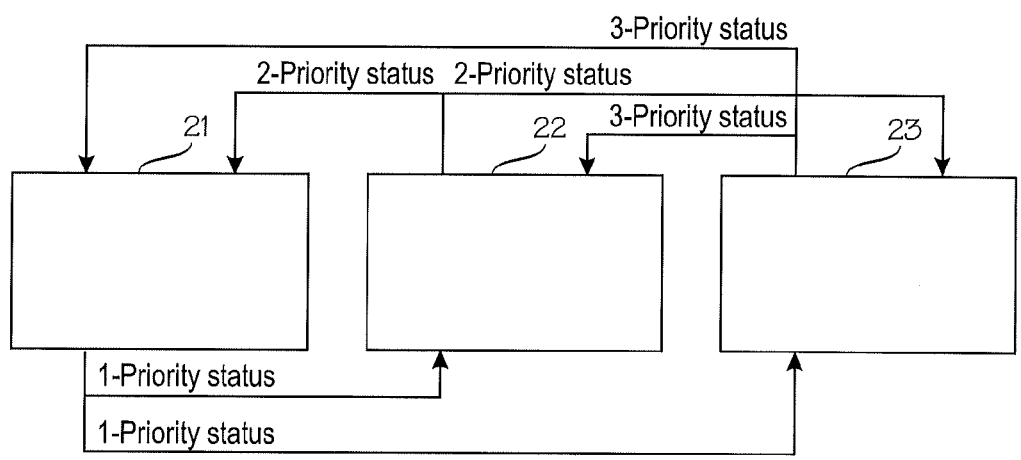
FIG. 4 illustrates a signalling diagram in accordance with an embodiment of the invention.

In the distributed way of implementation according to an embodiment, the control units 31, 32, 33 or corresponding entities of the loads communicate the individual electric powers required by the electric loads 21, 22, 23 to each other such that each of the loads knows the actual individual electric powers required by the other electric loads. The control units 31, 32, 33 in each of the loads can thus monitor the total electric power required by the loads. The communication of the individual electric powers required by the electric loads 21, 22, 23 to each other is illustrated in FIG. 3. In the example, the first load 21 transmits its actual power (in 1-ACT POWER message) to the second load 22 and the third load 23. In a similar manner, the second load 22 and the third load 23 transmit their actual powers (in 2-ACT POWER and S-ACT POWER messages, respectively) to the other loads. Furthermore, the control units 31, 32, 33 or corresponding entities of the loads preferably communicate the predetermined priority levels and the predetermined minimum power levels of the electric loads to each other. Consequently, each of the loads 21, 22, 23 knows the priority levels and minimum power levels of the other loads. This information may be transmitted in a suitable message, as illustrated in FIG. 4 in which the first load 21 transmits its priority level and minimum power level in 1-Priority status message to the second load 22 and the third load 23. In a similar manner, the second load 22 and the third load 23 transmit their priority levels and minimum power levels in 2-Priority status and 3-Priority status messages, respectively, to the other loads.

According to an embodiment, the determination as to whether the individual electric power required by an electric load should be reduced is performed in the electric loads 21, 22, 23 on the basis of the predetermined threshold value and the information communicated from the other electric loads. In other words, when the control units 31, 32, 33 of the loads receive the actual power information of the other loads and further the predetermined priority levels and the predetermined minimum power levels of the other loads, they may determine if they should reduce their power. The reasoning performed in an individual load 21, 22, 23, e.g. by the control unit 31, 32, 33 or a corresponding unit, may proceed as follows, for instance. First, the control unit 31, 32, 33 of the individual load monitors the total electric power required by all the loads 21, 22, 23. If the total electric power exceeds the predetermined threshold value, and thus the total electric power should be reduced, it is determined if all the loads having a lower priority than the load in question have already reduced their powers. This may be determined on the basis of the information communicated from the other loads, i.e. the actual powers, the predetermined priority levels and the predetermined minimum power levels of the other loads. If not, then it is waited until all the loads having a lower priority have reduced their powers. If the total electric power exceeds the predetermined threshold value and if all the loads having a lower priority have already reduced their powers, the control unit of the load in question determines that it is time to reduce the power of the load in question. When the above reasoning is performed simultaneously in each of the loads 21, 22, 23, the result is that the loads reduce their powers one priority level at a time until the total electric power does not exceed the predetermined threshold value.

Preferably, the predetermined threshold value for the total power, the load-specific priority levels and the load-specific minimum power levels are reconfigurable. In the distributed way of implementation described above, this may be implemented such that all the loads 21, 22, 23 have a suitable user interface which allows the user (or other controlling entity) of the system to configure the parameters. Such a user interface may be provided by the control units 31, 32, 33 of the loads, for example. It is also possible that the parameters are changed according to some predetermined conditions. The following table shows an example of possible actual values and set parameters in the loads used in a crane application with three different drive loads:

| DRIVE1 (hoist) | DRIVE2 (trolley) | DRIVE3 (slew) |
| --- | --- | --- |
| Actual power = 22 kW | Actual power = 5 kW | Actual power = 3 kW |
| Total power = 30 kW | Total power = 30 kW | Total power = 30 kW |
| Network LIM = ON | Network LIM = ON | Network LIM = ON |
| Net LIM SRC = int | Net LIM SRC = int | Net LIM SRC = int |
| Priority level = 1 | Priority level = 2 | Priority level = 3 |
| Int power limit = 20 kW | Int power limit = 20 kW | Int power limit = 20 kW |
| Power min = 15 kW | Power min = 3 kW | Power min = 2 kW | where:

Actual power=indicates the actual power of the load

Total power=indicates the actual total power of the total system of loads connected together Parameter network LIM=enable (ON) or disable (OFF) the power limitation logic Parameter net LIM SRC=defines the network limitation source, either internal calculation (int) or external source (ext)

Parameter priority level=defines the priority level of the load

Parameter int power limit=defines the predetermined threshold value for the total power Parameter power min=defines the load-specific minimum power level. Instead of a power level parameter also a parameter indicating a minimum speed level could be used in connection with a load involving movement such as a motor load since the speed is proportional to the power according to equation 1.

In the above example the predetermined threshold value (int power limit) for the total power of all the loads is set to be the same 20 kW. However, it would be possible to set a different value for some or all the loads. As a result, loads having a lower predetermined threshold value for the total power would reduce their powers earlier than loads having a higher threshold value. Thus, the predetermined threshold value for the total power could be used to define the priorities of the loads and no separate parameter (priority level) for the priority level would be needed.

The present invention according to the various embodiments may be applied to various applications comprising electric loads. Examples of such applications include various crane applications. The following gives examples of possible crane applications:

1) Industrial cranes: The power limitation according to the embodiments of the invention can be used if the electrical network in a factory is limited or not strong enough for the power requirements of the cranes (old supply transformer, long cables to the crane, bad network, wrong dimensioning, etc.), for example. The most common crane type of indoor cranes is an EOT crane (Electrical Overhead Traveling crane). Such cranes take power supply from power busbars and via slip rings which transfer the power to the moving crane supply unit. Sometimes with old cranes, vibration or wearing or external dust may deteriorate the power supply below 100%. Instead of the crane AC drives tripping because of under-voltage due to high loading of the network, the power limitation can be used to keep the crane running until network conditions have been repaired, for instance.

2) Harbour cranes: The power limitation according to the embodiments of the invention can be used in RTG cranes (Rubber Tyred Gantry cranes) if the total electrical crane capacity is higher than the available electrical power capacity from a diesel generator, for example. The operator may select which operation should be limited, depending on the conditions in the harbour, by setting the priorities of the crane drives accordingly. Another advantage that can be achieved is energy and money savings related to diesel generator dimensioning (fuel consumption). The crane drives including the power limitation functionality never load the generator above the limits set by the user.

3) Construction/tower cranes: The power limitation according to the embodiments of the invention can be used in construction-tower cranes if the available power supply is not strong enough on the site where the tower crane is temporary installed. These cranes are typically temporarily installed on different building sites and the connection to the electrical network is made to the nearest electrical crosspoint. If the available electrical power capacity is less than the electrical crane capacity, the power limitation can be used. Also, the ability to use smaller main fuses for the crane provides an advantage in the form of lower costs for connection to the electrical network.

4) Marine cranes aboard ships: The power limitation according to the embodiments of the invention can be used in marine cranes for different running conditions. When a ship is in harbour, the available electrical network capacity can be higher compared to when the ship is out at sea. Thus, the power limitation can be used especially when the ship is at sea.

An apparatus according to any one of the above embodiments, or a combination thereof, may be implemented as one unit or as two or more separate units that are configured to implement the functionality of the various embodiments. Here the term 'unit' refers generally to a physical or logical entity, such as a physical device or a part thereof or a software routine. One or more of these units may reside in an electric load, such as an electric drive or a component thereof such as an inverter or a frequency converter, for example.

An apparatus according to any one of the embodiments may be implemented at least partly by means of one or more computers or corresponding digital signal processing (DSP) equipment provided with suitable software, for example. Such a computer or digital signal processing equipment preferably comprises at least a working memory (RAM) providing storage area for arithmetical operations and a central processing unit (CPU), such as a general-purpose digital signal processor. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The computer may also have an operating system which may provide system services to a computer program written with the program instructions. The computer or other apparatus implementing the invention, or a part thereof, may further comprise suitable input means for receiving e.g. measurement and/or control data, and output means for outputting e.g. control data. It is also possible to use a specific integrated circuit or circuits, or discrete electric components and devices for implementing the functionality according to any one of the embodiments.

The invention according to any one of the embodiments, or any combination thereof, can be implemented in existing system elements, such as electric drives or components thereof, such as inverters or frequency converters, or similar devices, or by using separate dedicated elements or devices in a centralized or distributed manner. Present devices for electric drives, such as inverters and frequency converters, typically comprise processors and memory that can be utilized in the functions according to embodiments of the invention. Thus, all modifications and configurations required for implementing an embodiment of the invention e.g. in existing devices may be performed as software routines, which may be implemented as added or updated software routines. If the functionality of the invention is implemented by software, such software can be provided as a computer program product comprising computer program code which, when run on a computer, causes the computer or corresponding arrangement to perform the functionality according to the invention as described above. Such a computer program code may be stored or generally embodied on a computer readable medium, such as suitable memory, e.g. a flash memory or a disc memory from which it is loadable to the unit or units executing the program code. In addition, such a computer program code implementing the invention may be loaded to the unit or units executing the computer program code via a suitable data network, for example, and it may replace or update a possibly existing program code.

It is obvious to a person skilled in the art that as technology advances, the basic idea of the invention can be implemented in a variety of ways. Consequently, the invention and its embodiments are not restricted to the above examples, but can vary within the scope of the claims.

The invention claimed is:

1. A method for limiting an electric power required by at least two electric loads, each of which has a predetermined priority level, the method comprising:
  reducing the total electric power required by the at least two electric loads according to the predetermined priority levels of the electric loads if the total electric power exceeds a predetermined threshold value by reducing, in a priority-level-wise manner, individual electric powers required by the electric loads having the predetermined priority levels by starting from electric load or loads having the lowest priority level and proceeding, one priority level at a time, towards the highest priority level until the monitored total electric power does not exceed the predetermined threshold value, wherein the reducing of the total electric power comprises:

communicating individual electric powers required by the electric loads from each of the at least two electric loads to each other;

monitoring in each of the at least two electric loads the total electric power required by the at least two electric loads;

communicating the predetermined priority levels and predetermined minimum power levels of the electric loads from each of the at least two electric loads to each other; and determining in the electric loads if the individual electric power required by the electric load in question should be reduced on the basis of the predetermined threshold value and the information communicated from the other electric loads.

2. The method of claim 1, wherein each of the at least two electric loads has a predetermined minimum power level wherein the reducing of an individual electric power required by an electric load or loads of a given priority level comprises:
reducing the individual electric power required by the electric load to the predetermined minimum power level.

3. The method of claim 1, wherein each of the at least two electric loads has a predetermined minimum power level wherein the reducing of an individual electric power required by an electric load or loads of a given priority level comprises:
reducing gradually the individual electric power required by the electric load until the predetermined minimum power level is reached or until the monitored total electric power does not exceed the predetermined threshold value.

4. A non-transitory computer readable medium comprising computer program code embodied thereon, wherein execution of the program code in a computer causes the computer to carry out the steps of the method according to claim 1.

5. An arrangement for limiting an electric power required by at least two electric loads, each of which has a predetermined priority level, the arrangement being configured to:
reduce the total electric power required by the at least two electric loads according to the predetermined priority levels if the total electric power exceeds a predetermined threshold value, by reducing, in a priority-level-wise manner, individual electric powers required by the electric loads having the predetermined priority levels by starting from electric load or loads having the lowest priority level and proceeding, one priority level at a time, towards the highest priority level until the monitored total electric power does not exceed the predetermined threshold value, wherein the arrangement comprises, in connection with each of the at least two electric loads:

means configured to communicate the individual electric powers required by the electric loads, the predetermined priority levels and predetermined minimum power levels of the electric loads to each other;

means configured to monitor the total electric power required by said at least two electric loads; and means configured to determine if the individual electric power required by the electric load in question should be reduced on the basis of the predetermined threshold value and the information communicated from the other electric loads.

6. The arrangement of claim 5, wherein each of the at least two electric loads has a predetermined minimum power level wherein the arrangement is configured to, when reducing an individual electric power required by an electric load or loads of a given priority level, reduce the individual electric power required by the electric load to the predetermined minimum power level.

7. The arrangement of claim 5, wherein each of the at least two electric loads has a predetermined minimum power level wherein the arrangement is configured to, when reducing an individual electric power required by an electric load or loads of a given priority level, reduce gradually the individual electric power required by the electric load until the predetermined minimum power level is reached or until the monitored total electric power does not exceed the predetermined threshold value.

8. The arrangement of claim 5, wherein at least one of the at least two electric loads comprises at least one electric drive.

9. An electric drive, the electric drive being configured to:
monitor a total electric power required by at least two electric loads, wherein one of the at least two electric loads is the electric drive;

reduce an electric power required by the electric drive on the basis of a predetermined threshold value, the monitored total electric power required by the at least two electric loads, and predetermined priority levels of the at least two electric loads; and communicate an individual electric power required by the electric drive, the predetermined priority level of the electric drive, and a predetermined minimum power level of the electric drive to other loads of the at least two electric loads.

* * * * *